Feb. 24, 1948.    DE WITT D. MERRICK    2,436,444
PREDETERMINED-CURRENT-DROP RELAY SYSTEM
Filed July 30, 1943

INVENTOR
D. D. MERRICK
BY
E. R. Nowlan
ATTORNEY

Patented Feb. 24, 1948

2,436,444

UNITED STATES PATENT OFFICE 2,436,444

PREDETERMINED-CURRENT-DROP RELAY SYSTEM

De Witt D. Merrick, Cranford, N. J., assignor to Western Electric Company, Incorporated, New York, N. Y., a corporation of New York Application July 30, 1943, Serial No. 496,819

3 Claims. (Cl. 175—320)

This invention relates to control apparatus, and more particularly to differential ammeters for controlling the electrical drying of electrical cables.

In the manufacture of electrical cables after the numerous electrical conductors have been individually insulated and bound together to form a cable core prior to being covered, for example, with a lead alloy sheath, it is important that such cores be freed from moisture prior to passing through the sheathing apparatus. It has been the custom in some cases to enclose such cable cores in a sealed chamber and, through the aid of a vacuum and the application of electrical current through the cable core to heat and drive out the moisture. The temperature desired for accomplishing this result may vary depending upon the diameter and length of the cable core and/or the size of the conductors of which it is composed. When drying cable cores by the application of electrical current, it is known that as the temperature increases, the amperage decreases. For a given starting and finishing temperature, the ratio of starting and finishing current can be calculated and will always be the same regardless of the value of the current.

An object of the invention is to provide a simple yet highly efficient apparatus for indicating variations in an electrical current of an electrical circuit and to control the latter.

With this and other objects in view, the invention comprises a control apparatus actuable by the electric current in an electrical circuit, for heating an article, to indicate variations in the electric current and to open the circuit when a given temperature in the article has been reached.

Figure 1:
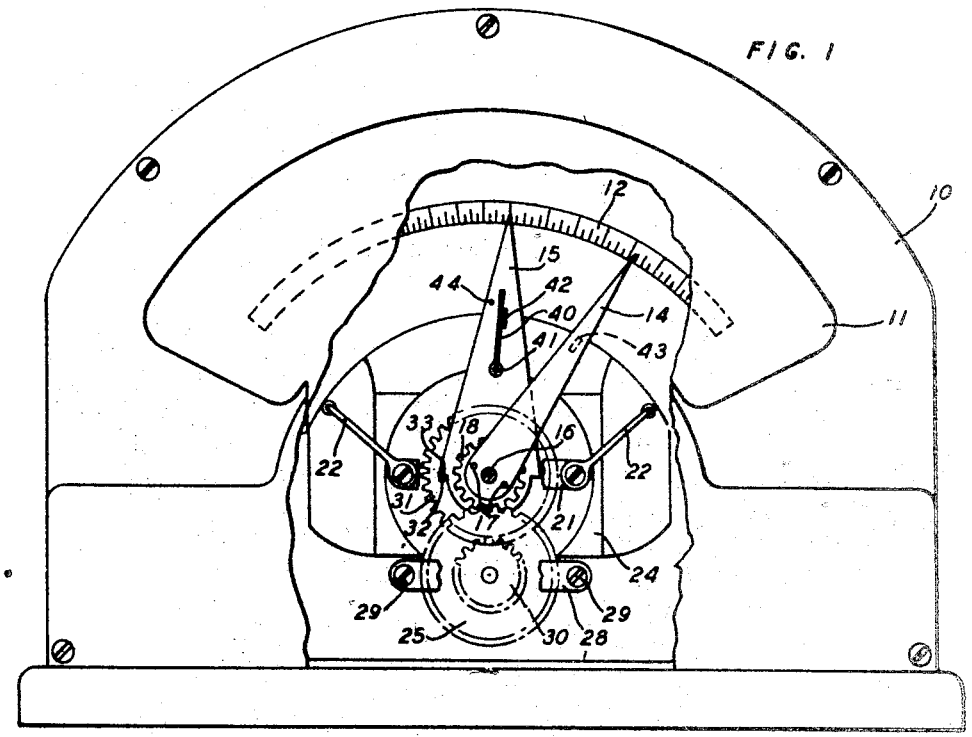
Figures 2, 3:
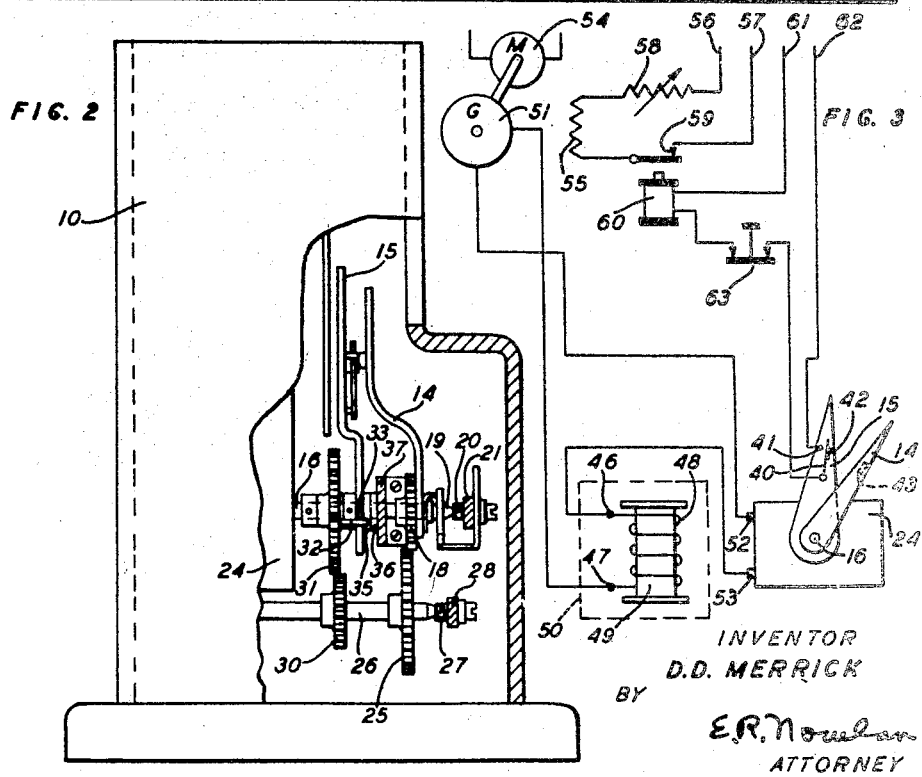

Other objects and advantages will be apparent from the following detailed description when considered in conjunction with the accompanying drawing, wherein Fig. 1 is a front elevational view of a control apparatus, portions thereof being broken away;

Fig. 2 is a side elevational view of the apparatus, portions thereof being shown in section, and Fig. 3 is a wiring diagram illustrating the function of the apparatus.

Referring now to the drawing, attention is first directed to Figs. 1 and 2, which illustrate a housing 10 having a transparent window 11 in the front cover thereof through which a scale 12 together with a hand 14 and an indicator 15 may be observed. The hand 14 is disposed upon a shaft 16 and is secured, at 17, to a gear 18, the latter being fixedly mounted upon the shaft 16.

By viewing Fig. 2, it will be apparent that a conical forward end 19 of the shaft 16 is journalled in the end of a bearing screw 20 supported by a bar 21 which has its ends supported by arms 22, as shown in Fig. 1. The shaft 16 is a part of an ammeter unit 24, which may be of the conventional type, to cause rotation of the shaft and movement of the hand therewith relative to the scale 12 through variations in the amperage of an electrical current in an electrical circuit connected therewith. The indicator 15 is adapted to be driven only in one direction and at a given ratio with respect to the movement of the hand 14.

This movement of the indicator is accomplished through a train of gears, including the gear 18, it being fixed to the shaft 16 and interengaging a gear 25 on a shaft 26. The shaft 26 is supported between bearings, only one of which is shown and indicated at 27. The bearing 27 is supported by a cross member 28, the ends of which are supported as at 29 (Fig. 1). Another gear 30 is mounted upon the shaft 26 and interengages a gear 31, the latter being disposed upon the shaft 16 for free rotation thereon. A pin 32, carried by the gear 31, is positioned to engage a shoulder 33 of the indicator 15, to provide a driving connection between the gear 31 and the indicator. Disposed concentric with the shaft 16 and carried by the indicator 15, is a friction member 35 which is positioned in engagement with a stationary friction member 36 supported by a stationary bracket 37. The purpose of the friction members is to enable the indicator 15 to be positively driven in one direction, that is clockwise (Fig. 1), through the movement of the hand 14 and the train of gears, but to hold the indicator against movement in the opposite direction, that is counterclockwise, during the return movement of the hand until the hand reaches the position adjacent the indicator, as will hereinafter be described.

A switch member 40, mounted at 41 upon the indicator 15, carries an insulating block 42 positioned to be engaged by a projection 43 carried by the hand 14. Upon return movement of the hand 14, engagement of the projection 43 with the block 42 will move the switch member 40 into engagement with a contact 44, to complete an electrical circuit.

Attention is now directed to Fig. 3, which shows schematically the ammeter unit 24 together with the hand 14, the indicator 15, the switch 40 and the contact 41. The unit 24 is included in an electrical circuit, terminals 46 and 47 of which may be provided with suitable means for electrical connection with the ends of an article 48 such as an electrical cable core wound upon a reel 49. This entire structure, that is, the reel with the cable core and the connections, may be disposed in a sealed housing represented by dot and dash lines indicated at 50. The electrical current for the circuit, in the present instance, is received from a generator 51, and the circuit may be traced from the generator into the ammeter unit 24 at connection 52, out of the unit at 53, through connection 46, the article or cable unit 48, and through connection 47 to the generator. The generator 51 is driven by a constant speed motor 54, the electrical circuit for which may be controlled in any desired manner.

The generator field is indicated at 55, it being included in an electrical circuit including leads 56 and 57 connected to any suitable source (not shown). This circuit includes also a variable resistance unit 58 and a normally closed relay contact 59. Any additional electrical units or switches may be disposed in the circuit to add to its functioning, depending upon its use, and the results desired. The contact 59 is under the control of a relay 60 of a circuit including leads 61 and 62 connected to another suitable source (not shown). This circuit includes a starting switch 63 together with the switch member 40 and the contact 44. The circuit may be traced from lead 61 through the relay 60, normally closed switch 63, switch member 40 when closed, contact 44, to lead 62.

Upon considering the operation of the control apparatus, let it be assumed that the reel of cable core 48 is electrically connected in the generator circuit and disposed in the sealed housing 50 ready to be dried. The electrical characteristics of the cable core have been predetermined and the field current for the generator has been controlled through the variations in the resistance 58. Variation in the current may also depend upon the length of the cable core in determining the finished temperature necessary for completely driving out all the moisture in the cable core. Let it be assumed that the starting temperature of the core is seventy degrees (70°) and that the desired finishing temperature is two hundred and seventy degrees (270°). With a cable of approximately three thousand (3,000) feet in length, the desired electrical current will be of substantially one hundred (100) volts, with a starting amperage of one thousand (1,000). For a given starting and finishing temperature in the cable core, the ratio of the starting and finishing amperage of the current can be calculated and will always be of the same ratio regardless of the value of the current. By the use of the control apparatus this principle can be employed and the supply of electrical current to the cable core will be terminated when the desired temperature in the core has been reached. Thus with a starting amperage of one thousand (1,000), a finishing amperage of seven hundred (700) is desired. The train of gears connecting the hand 14 with the control indicator 15 causes movement of the latter through a given ratio (seven to ten) with respect to the hand 14.

In starting the apparatus to begin the heating of the cable core, the switch 63 is opened to cause deenergization of relay 60 which, at the beginning, is energized through the closing of the switch 40 when both the hand 14 and the indicator 15 are in their normal or zero positions. Immediately upon deenergization of the relay 60, the contact 59 will close, closing the field circuit through the field 55 to cause the generator 51 to create a given electrical current in the circuit which includes the ammeter unit 24 and the cable core 48. The electrical current causes actuation of the unit 24 to cause movement of the shaft 16, moving with it the hand 14 relative to the scale 12 to a position where it will register one thousand (1,000) amperes. During this travel of the hand 14, the indicator 15 will move seventy per cent (70%) of the same distance through the train of gears and the engagement of the pin 32 therewith. Thus a positive means is provided to move the indicator 15 a given portion of the distance of movement of the hand 14, the indicator, however, being held against return or counterclockwise movement through the friction members 35 and 36.

After the hand 14 reaches its farthest position, indicating that the full electrical current has been applied to the cable core, the hand will remain in this position until the increase in temperature in the cable core causes a decrease in the amperage of the electrical current. The decrease in the amperage of the electrical current will be registered by the hand 14 moving counterclockwise, the indicator 15 remaining in its previously moved position. The hand 14 will continue its counterclockwise movement during the decrease in the amperage of the electrical circuit until the projection 43 engages the block 42 of the switch member 40 and moves the latter into engagement with the contact 44.

By viewing Fig. 3, it will be apparent that during the closing of the circuit through the switch 40 and the contact 44, the switch 63 having been allowed to close after the initial starting of the apparatus, the relay circuit will be closed through the relay 60, causing opening of the contact 59, thus opening the field circuit 55 to the generator 51. At this interval the heating of the electrical cable core has been completed. If desired, the reel with the cable core may remain in the housing 50 a given length of time, to assure the removal by vacuum of all of the moisture forced from the core by the heating previously described. During this interval the generator field circuit having been rendered ineffective, the force applied to the hand 14 by the unit 24 to return the hand to its zero position will cause, through the projection 43 and its engagement with the switch 40, movement of the indicator 15 to its zero position. The apparatus is thus in readiness for controlling another drying operation after the removal of the connections 46 and 47 from the cable core 48.

The apparatus not only indicates the full amperage of the electrical current of the circuit it controls and the finishing amperage but indicates the increase in temperature in the article to the desired finishing temperature by the decrease in amperage registered by the hand and scale. In addition, the apparatus controls the relay and field circuits to open the electrical circuit carrying the heating current to the article when the desired temperature has been reached throughout the article.

Although specific improvements of the invention have been shown and described, it will be understood that they are but illustrative and that various modifications may be made therein without departing from the scope and spirit of this invention as defined by the appended claims.

What is claimed is:

1. A control apparatus comprising an ammeter unit actuable by an electrical current in an electrical circuit, a scale, a hand movable by the unit relative to the scale between a zero position and a given high position to indicate the amperage of the electrical current, an element, means operatively connecting the hand and element to cause movement of the element in one direction at a given ratio relative to the movement of the hand, means to hold the element against return movement, and means actuable by the return of the hand to the element to cause termination of the conduction of the electrical current through the circuit.

2. A control apparatus comprising an ammeter unit actuable by an electrical current in an electrical circuit, a scale, a hand movable by the unit relative to the scale between a zero position and a given high position to indicate the amperage of the electrical current, an element, means operatively connecting the hand and element to cause movement of the element in one direction at a given ratio relative to the movement of the hand, frictional means to hold the element against return movement, and means actuable by the return of the hand to the element to cause termination of the conduction of the electrical current through the circuit.

3. A control apparatus comprising an ammeter unit actuable by an electrical current in an electrical circuit, a scale, a hand movable by the unit relative to the scale between a zero position and a given high position to indicate the amperage of the electrical current, an element, a differential mechanism operatively connecting the hand and element to cause movement of the element in one direction at a given ratio relative to the movement of the hand, means to hold the element against return movement, and means actuable by the return of the hand to the element to cause termination of the conduction of the electrical current through the circuit.

DE WITT D. MERRICK.

REFERENCES CITED

The following references are of record in the file of this patent:

UNITED STATES PATENTS

| Number | Name | Date |
|---|---|---|
| 396,940 | Knowles | Jan. 29, 1889 |
| 441,973 | Rapieff | Dec. 2, 1890 |
| 487,515 | Bryon, Jr. | Dec. 6, 1892 |
| 502,649 | Andersen | Aug. 1, 1893 |
| 683,831 | Arcioni | Oct. 1, 1901 |
| 931,613 | Jackson | Aug. 17, 1909 |
| 1,230,357 | Woodrow | June 19, 1917 |
| 1,288,589 | Hood | Dec. 24, 1918 |
| 1,810,172 | Hayes | June 16, 1931 |
| 1,936,192 | Hammond | Nov. 21, 1933 |
| 2,052,761 | Gaines | Sept. 1, 1936 |
| 2,098,986 | Winters | Nov. 16, 1937 |
| 2,104,743 | Jones | Jan. 11, 1938 |
| 2,110,196 | Brohman | Mar. 8, 1938 |
| 2,235,895 | Maize | Mar. 25, 1941 |
| 2,251,475 | Walker | Aug. 5, 1941 |
| 2,373,202 | Snell | Apr. 10, 1945 |